United States Patent [19]
Cusack

[11] Patent Number: 6,160,372
[45] Date of Patent: Dec. 12, 2000

[54] SOLID STATE MOTOR START METHOD AND APPARATUS

[75] Inventor: Jon B. Cusack, Holland, Mich.

[73] Assignee: Robertshaw Controls Company, Richmond, Va.

[21] Appl. No.: 09/114,889

[22] Filed: Jul. 14, 1998

Related U.S. Application Data

[60] Provisional application No. 60/052,413, Jul. 14, 1997.

[51] Int. Cl.[7] ........................................ H02P 1/42
[52] U.S. Cl. .............................. 318/786; 318/785
[58] Field of Search ........................ 318/785–787

[56] References Cited

U.S. PATENT DOCUMENTS

| | | |
|---|---|---|
| 3,728,601 | 4/1973 | Fricker et al. ........................ 318/787 |
| 3,740,631 | 6/1973 | Fricker et al. ........................ 318/787 |
| 3,761,792 | 9/1973 | Whitney et al. . |
| 3,810,480 | 5/1974 | Smith et al. ........................ 134/104.1 |
| 3,970,908 | 7/1976 | Hansen et al. ........................ 318/786 |
| 4,047,082 | 9/1977 | Scheuer et al. ........................ 318/782 |
| 4,481,786 | 11/1984 | Bashark ........................ 62/160 |
| 4,636,702 | 1/1987 | Hedges . |
| 4,651,077 | 3/1987 | Woyski . |
| 4,804,901 | 2/1989 | Pertessis et al. ........................ 318/786 |
| 4,843,295 | 6/1989 | Thompson et al. . |
| 4,958,118 | 9/1990 | Pottebaum . |
| 5,013,990 | 5/1991 | Weber ........................ 318/814 |
| 5,077,512 | 12/1991 | Weber ........................ 318/776 |
| 5,206,573 | 4/1993 | McCleer et al. . |
| 5,442,272 | 8/1995 | Schwartz . |
| 5,451,853 | 9/1995 | Itoh . |
| 5,483,139 | 1/1996 | Welles II ........................ 318/782 |
| 5,512,809 | 4/1996 | Banks et al. . |
| 5,689,168 | 11/1997 | Bogwicz et al. ........................ 318/772 |

*Primary Examiner*—Brian Sircus
*Attorney, Agent, or Firm*—John M. England, Jr.; Jules Jay Morris; Terrence (Terry) Martin

[57] ABSTRACT

A motor start circuit for A-C electric motors. A microprocessor-based circuit is used to detect the phase shift that occurs in the motor current as the motor goes from the initial locked-rotor state to the running state. This circuit applies current to a motor 'start' winding when the motor is first switched on, but turns off the start winding when the motor achieves sufficient running speed, as indicated by the shift in phase of the current in the motor's 'run' winding. For bi-directional motors with two start windings, the microprocessor can apply current to either start winding.

35 Claims, 7 Drawing Sheets

SOLID STATE MOTOR START METHOD AND APPARATUS

RELATED APPLICATIONS

This application is based on subject matter disclosed in provisional application 60/052,413 filed Jul. 14, 1997, and claims the benefit of that filing date.

TECHNICAL FIELD

The invention relates to AC electrical motor starting. More particularly, it relates to a bi-directional AC electrical motor starting circuit that operates without a starter solenoid. Such a motor starting circuit may be used in a household appliance, such as a dishwasher.

BACKGROUND OF THE INVENTION

Conventional AC bidirectional electric motors typically have three motor windings: the main "run" winding, the clockwise start winding, and the counter-clockwise start winding. To turn the motor on, AC voltage is first applied to the run winding. Soon thereafter, AC voltage is applied to one of the two start windings. This forces the motor to turn in one direction or the other. Once the motor is running, voltage can then be removed from the start winding. A unidirectional motor will only have a single start winding, since it only needs to be started in one direction.

When AC voltage is first applied to the run winding, the current is very high and the motor is not as inductive as while running. This is commonly known as the "locked-rotor" state, because the motor is not turning. When the motor does start to turn, the inductive characteristic increases and as a result, the current through the motor is reduced.

In conventional starter circuits, the start winding is usually connected in series with a solenoid. The solenoid is turned on by the high locked-rotor current of the motor, and the solenoid in turn provides power to the start winding. After the motor reaches running speed, the current through the solenoid is reduced sufficiently for the solenoid to drop out, thus removing voltage from the start winding. For bi-directional capability, two start windings are provided, with a relay or another switch determining which start winding is used, and therefore which direction the motor rotates.

The problem with these conventional approaches is that the cost of the solenoid is high, both in terms of its purchase price and in the additional labor costs and wiring harness expense that are required to install it into an end product.

DISCLOSURE OF THE INVENTION

The present invention uses both the current through the motor and the phase shift resulting from the changing inductance of the motor during start-up to determine whether the motor has started or not. Combining these two factors emphasizes the changes created by the characteristic inductive difference between the locked-rotor and run modes, making it easy to detect the motor condition and utilize this status information for controlling the motor.

Because of the great difference between locked-rotor and running modes, a microcontroller can readily be applied to determine this difference. Calibration is not required; the motor is known to be in the locked-rotor condition when it is first turned on. Thus the phase of the signal at startup is established as the locked-rotor mode signal. Positive phase shift from this point can be used to determine if the motor is running, and this determination can be made with low-cost electronic circuits, such as one containing a microcontroller or microprocessor. A controllable output of the microprocessor can be used to turn the start winding on or off with a suitable switching component such as a triac. For bi-directional motors, a second output can similarly be used to control a second start winding, which would start the motor in the opposite direction.

An object of the invention is to provide a solid state motor starting circuit that does not use a solenoid.

Another object of the invention is to provide an AC motor starting circuit that switches voltage to a start winding based on phase shift caused by the changing inductance of the motor during startup.

Another object of the invention is to provide an AC motor starting control circuit with lower cost and greater reliability than a solenoid-based starter circuit.

DETAILED DESCRIPTION OF THE PREFERRED EMBODIMENTS

Figure 1:
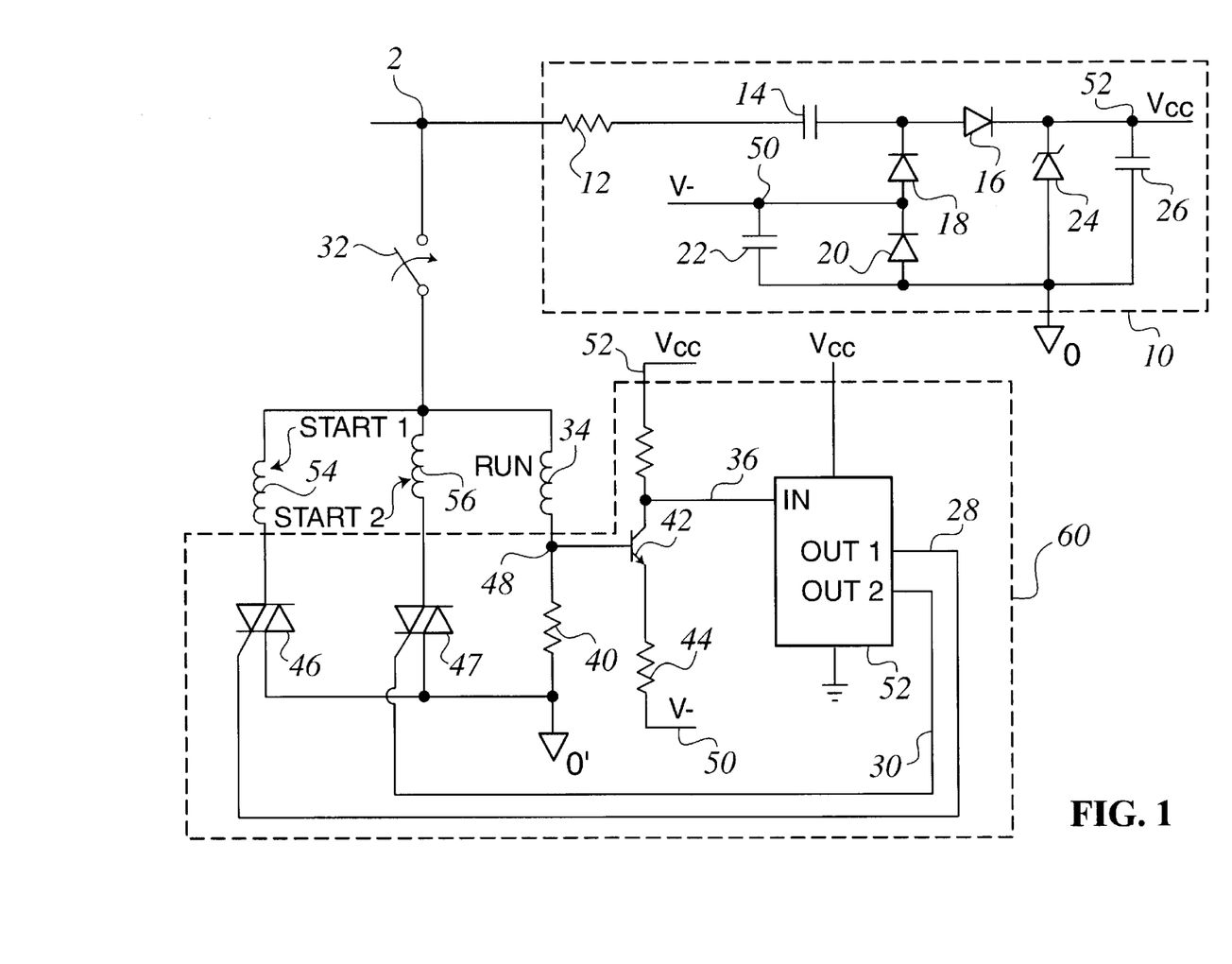
FIG. 1 shows a simplified schematic diagram of the invention.

FIG. 1 shows a simplified schematic of a preferred embodiment, including solid-state switching circuit 60 and power supply 10 which provides DC power to switching circuit 60. AC power is provided at node 2, from where it is connected to the input of power supply 10. AC power to the motor is controlled by switch 32, which can be a simple switch or a relay. When switch 32 is closed, it provides AC power to the motor for run winding 34 and for start windings 54, 56.

Figure 6:
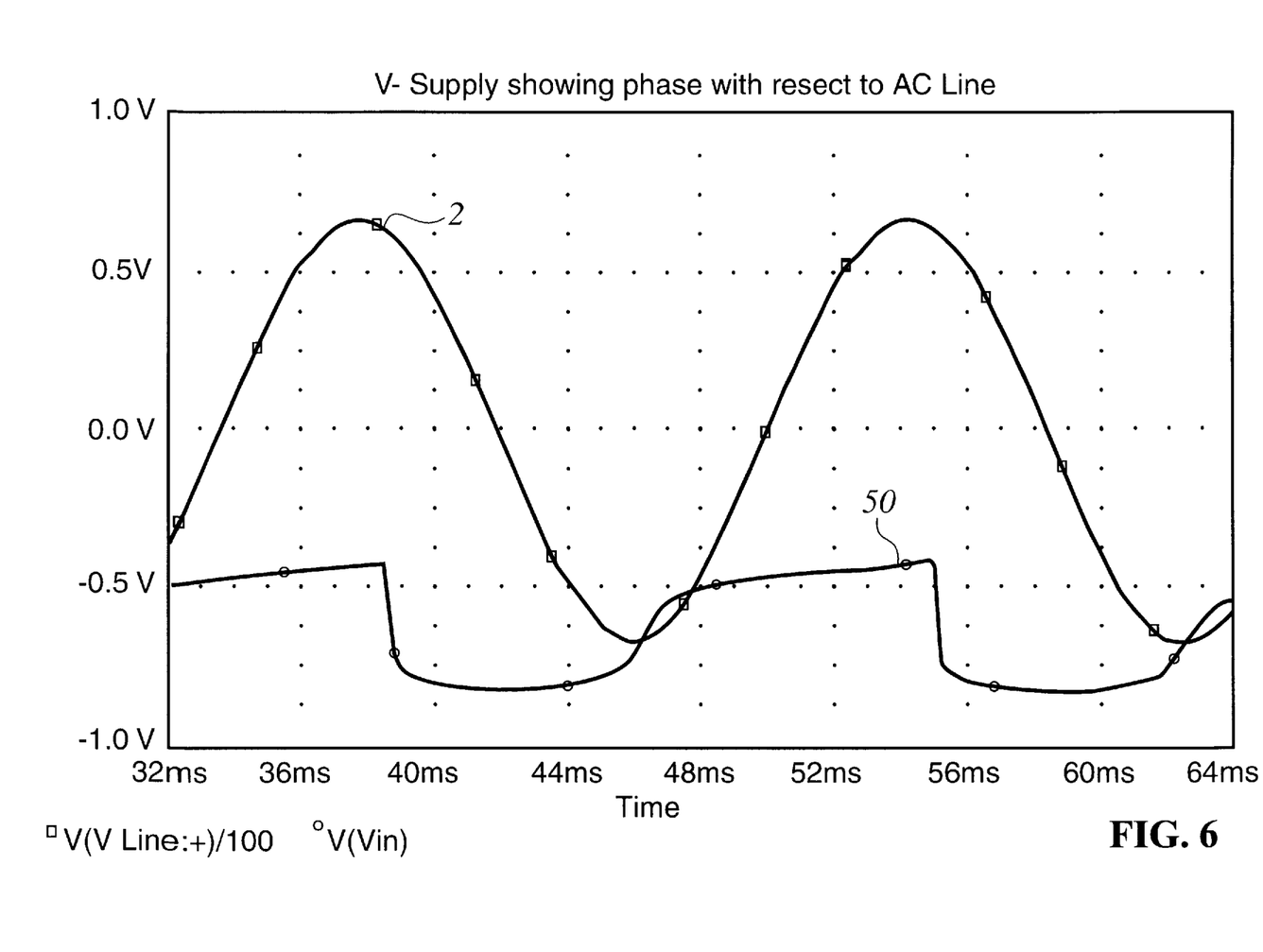
FIG. 6 shows a waveform chart showing the AC line voltage and the V− supply voltage.

As shown in FIG. 1, power supply 10 can be a simple circuit using a resistor 12, three capacitors 14, 22, 26, three diodes 16, 18, 20, and a Zener diode 24. Zener diode 24 provides adequate regulation for a stable voltage Vcc at node 52. Voltage V− at node 50 is not regulated, and contains some ripple as shown in FIG. 6. Other power supplies may also be used in place of power supply 10.

Voltages Vcc and V− provide DC power for transistor 42, while Vcc can also be used to power microprocessor 52. Microprocessor 52 might be used to perform many functions, but only the motor start control functions are described herein.

When switch 32 is closed, AC power is provided to motor run winding 34. The current passing through run winding 34 also passes through a low-resistance, voltage-dropping component such as resistor 40, which is connected in series with run winding 34 to generate a voltage at node 48 that is proportional to the current through run winding 34. The phase of the signal across resistor 40 is, of course, the same as the phase of the current through run winding 34. In the locked-rotor state, because the load is less inductive, the phase shift between node 2 and node 48 is at a minimum. While the motor is running at normal speed, this phase shift will be at its maximum because the load is more inductive. Since node 48 is connected to the input of transistor 42, both the amplitude and phase of the signal at node 48 can determine when transistor 42 is switched on and off.

For an illustrative example, given a 120V AC motor having a peak run current of 10 amps, a peak locked-rotor current of 20 amps, and an internal winding resistance of 2.5 ohms, the phase shift would be about negative 25° between the locked-rotor and run modes. These values have been verified in tests. During the locked-rotor mode, the current is typically 2–3 times that of the run mode. This change will cause a proportionate voltage to appear across resistor 40. The higher voltage occurring at node 48 for the locked-rotor mode (and the resulting faster ramp-up of the rising edge of the associated sinewave) will allow a voltage-level sensitive device to sense the locked-rotor condition earlier in the AC line cycle than it would the run condition.

For example, in the circuit of FIG. 1, approximately 200 mV at the base of transistor 42 might be required to turn transistor 42 on. If resistor 40 has a value of 0.02 ohms, transistor 42 will not turn on until near the peak of the voltage across resistor 40 while in the run mode (10 * 0.02=200 mV). In the locked-rotor mode the peak current would be about 20 amps, which would develop a peak voltage of 400 mV across resistor 40 (20 * 0.02=400 mV). Transistor 42 would turn on at: $(200/400) \sin^{-1}$, or 30° with respect to the zero-crossing of the AC voltage at node 48. This is a shift of negative 60° with respect to the run mode.

Thus, combining the two dominant factors (amplitude and phase shift) results in a high power level (caused by the locked-rotor current) earlier in the AC line voltage cycle (caused by less phase shift) in the locked-rotor mode than the run mode. These relationships are shown in FIGS. 2–5, each of which compares the input or output of transistor 42 with the AC voltage at node 2. The amplitude of the high-voltage AC signal at node 2 is not drawn to scale in these figures. It's amplitude is compressed to better show its phase relationship with the low voltage signals at nodes 48 and 36. Each vertical dotted line in FIGS. 2–5 represents 90° of phase difference.

Figure 2:
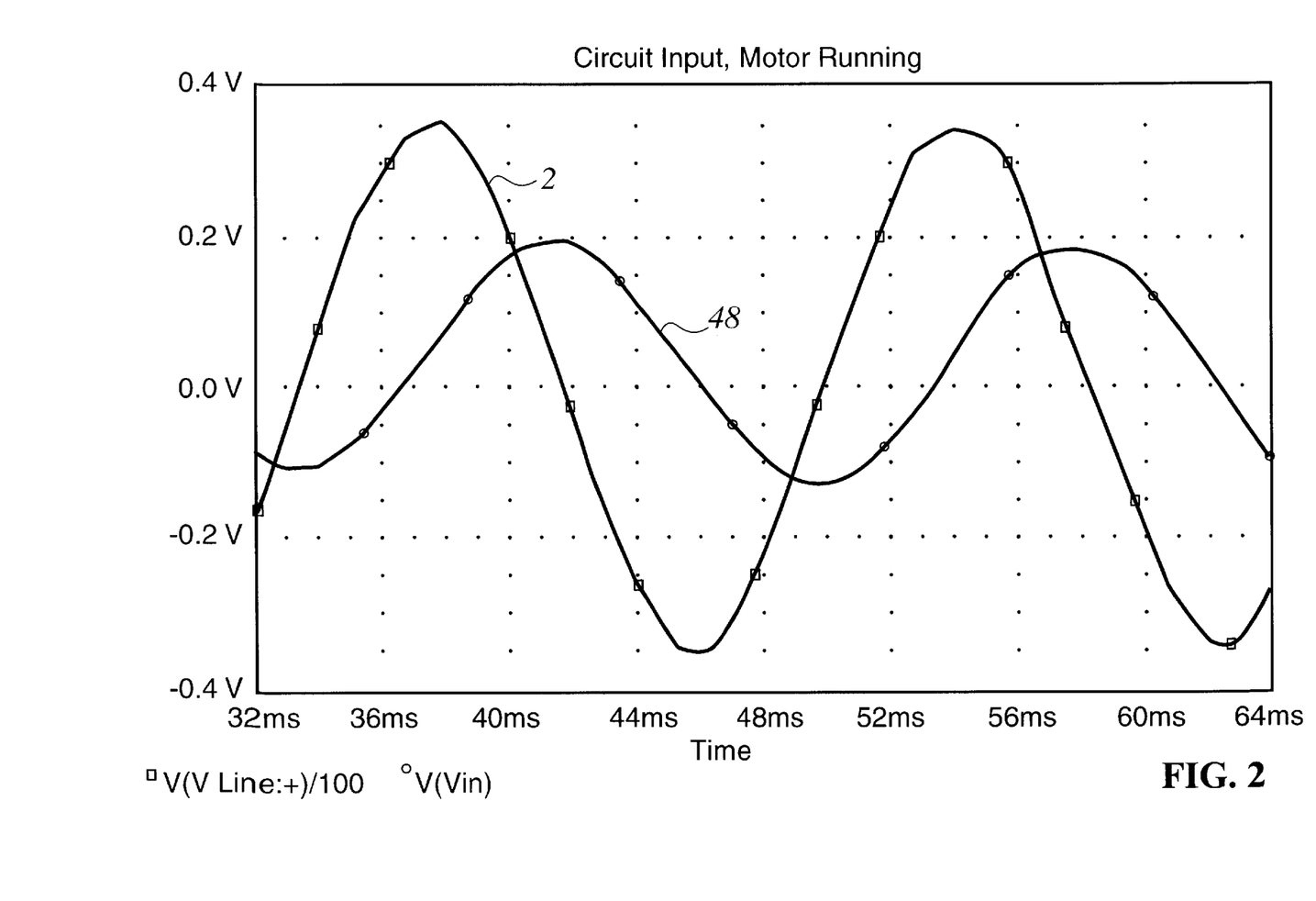
FIG. 2 shows a waveform chart showing the AC line voltage and the circuit input with the motor running.
Figure 3:
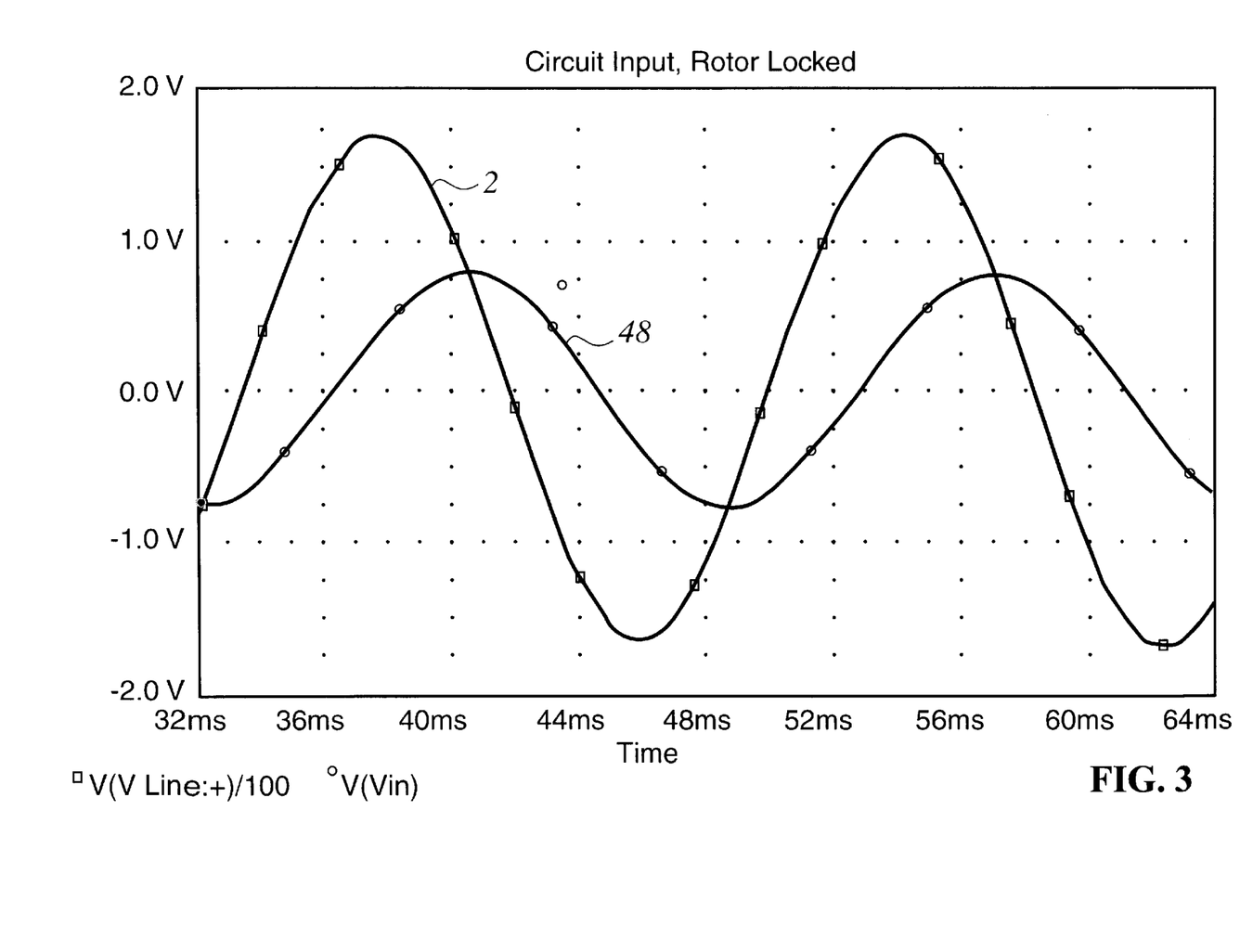
FIG. 3 shows a waveform chart showing the AC line voltage and the circuit input, with the motor in a locked-rotor condition.

FIG. 2 shows the signal at node 48 which is input to transistor 42 when the motor is running. FIG. 3 shows the same signal when the motor is in the locked-rotor mode. Comparing these two figures shows that the phase of the signal at node 48 is shifted to the right when the motor goes from the locked-rotor mode to the running mode.

Figure 4:
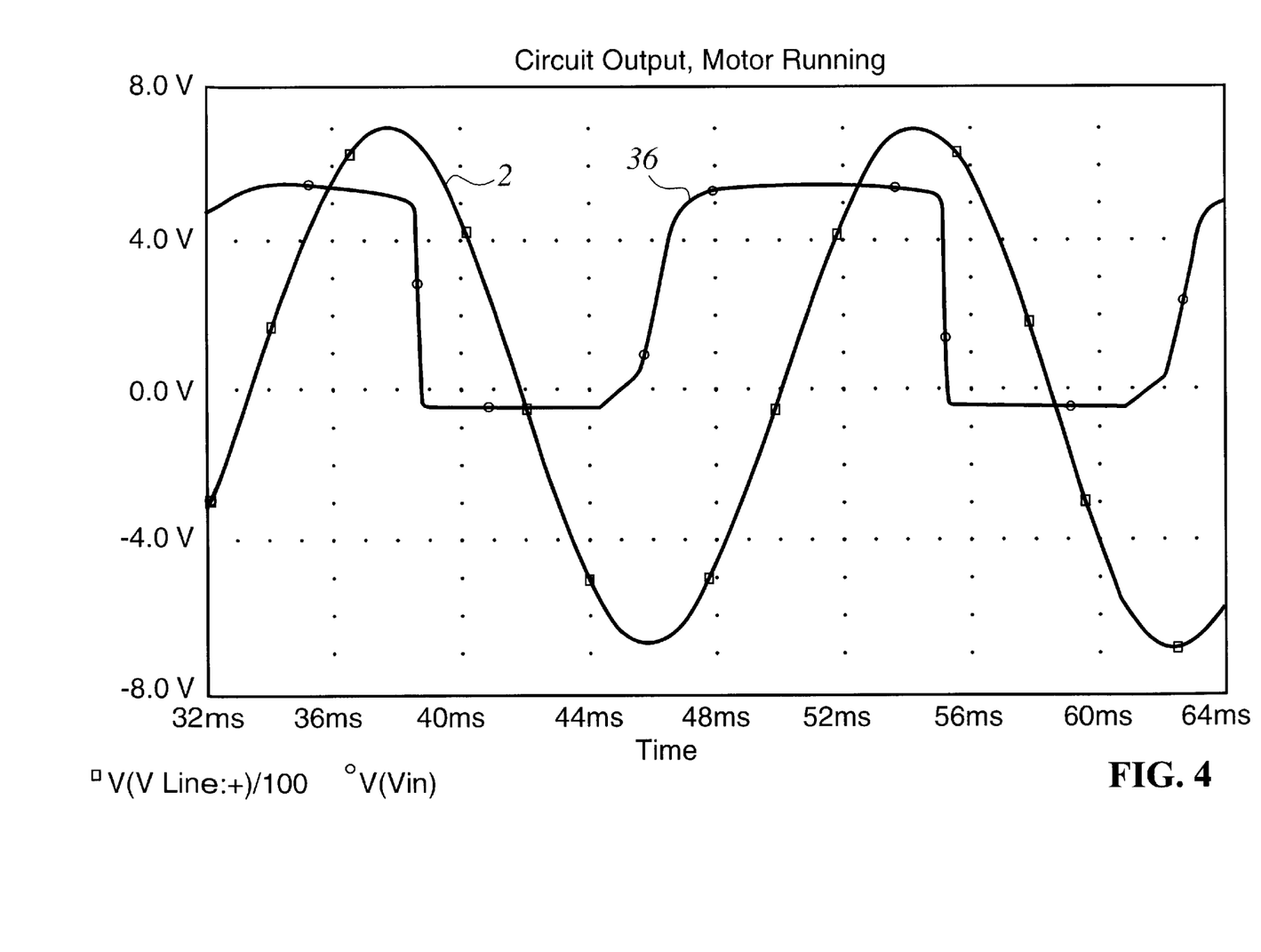
FIG. 4 shows a waveform chart showing the AC line voltage and the circuit output with the motor running.
Figure 5:
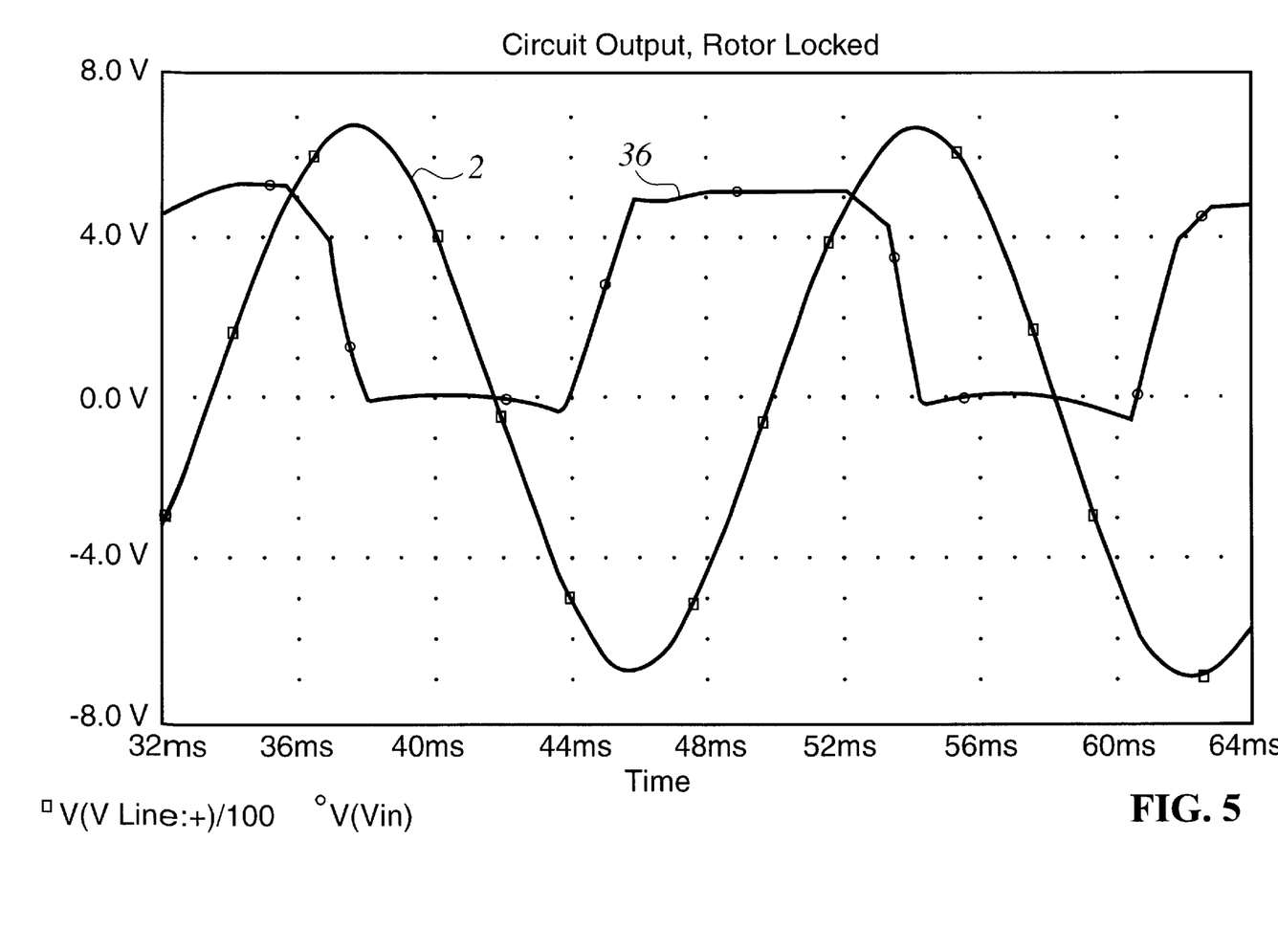
FIG. 5 shows a waveform chart showing the AC line voltage and the circuit output with the motor in a locked-rotor condition.

FIG. 4 shows the signal at node 36 which is output from transistor 42 when the motor is running. FIG. 5 shows the same signal when the motor is in the locked-rotor mode. Comparing these two figures shows that the phase of the signal at node 36 is also shifted to the right when the motor goes from the locked-rotor to the running mode. FIGS. 4 and 5 also show that the signal at node 36 has a shape and amplitude that are suitable for standard digital logic circuits. The timing of the signal transitions (the rising and falling edges) of this signal can therefore be examined by microprocessor 52 to provide a digital analysis of the phase shifts occuring in the circuit. Based on this analysis, microprocessor 52 can then turn its output signal 28 on or off to control triac 46. Triac 46 acts as an AC switch to turn start winding 54 on or off.

Microprocessor 52 can also be a microcontroller. The two terms are sometimes used interchangeably in the industry, and the term 'microprocessor' is used herein to indicate either. Other types of programmable logic devices can also be used instead of a microprocessor, such as a programmable gate array or its equivalent.

Bi-directional motors typically have two start windings, one to start the motor in each direction. FIG. 1 shows that a second output 30 from microprocessor 52 can be used to control a second start winding 56 with a second triac 47. Microprocessor 52 can be configured to determine which output to control through any conventional method (not shown).

As shown in FIG. 6, the ripple on the V– supply from power supply 10 can also be used in the analysis. In the example given here, V– (node 50) has a edge of approximately 0.3 volts at approximately 90° of the AC voltage signal at node 2. This changes the biasing of transistor 42, which can cause transistor 42 to turn on coincident with this falling edge. Since transistor 42 is turned off based on the aforementioned phase shifting relationships, the elapsed time between turning transistor 42 on and turning transistor 42 off can be a direct measure of phase difference. Thus microprocessor 52 can determine phase difference by simply determining the pulse width of its input signal, which is the signal at node 36. Alternately, microprocessor 52 can use another input to detect a specific point in the cycle of the AC voltage signal at node 2 (such as a zero-crossing detector, which is known in the art), and compare the phase at node 36 with this signal. Zero-crossing detector circuits are well known in the art and are not further described herein.

Detecting a change in the phase of the falling edge of the signal at node 36 can also indicate transition from locked-rotor to run mode, even without measuring the amount of that change. When switch 32 is open, there are no transitions to detect at the output of transistor 42. When the motor is first turned on, the timing of the resulting transitions must be assumed to represent the locked-rotor condition. Once the phase of these transitions begins to advance, the motor can be assumed to be running, and the actual phase is no longer important. Start winding 54 (or 56) can then be turned off. Without this feature, microprocessor 52 would have to monitor the output signal for a longer time.

In some applications, the phase difference while in run mode may also want to be utilized, to determine such things as motor load, etc.

Figure 7:
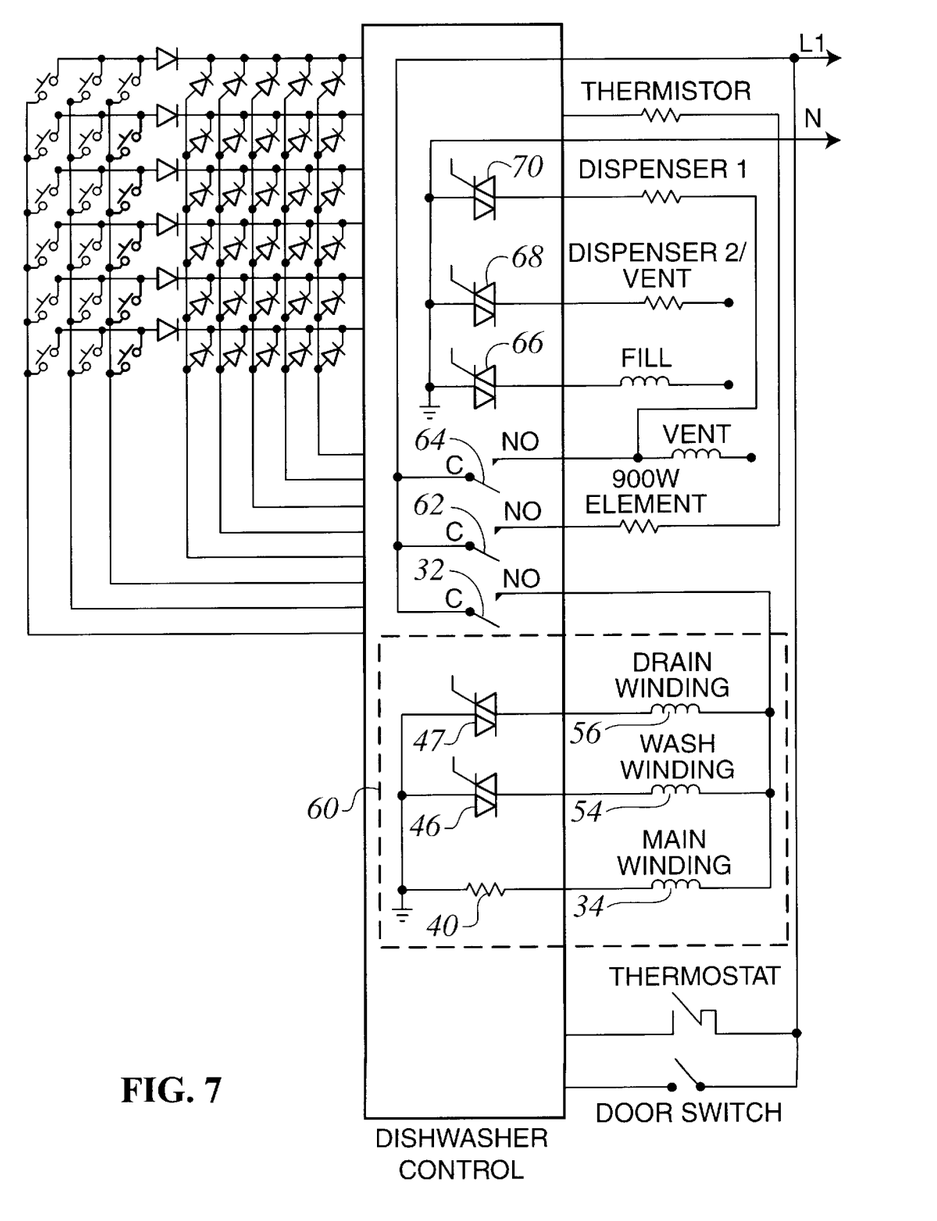
FIG. 7 is a schematic diagram of portions of the invention of FIG. 1 applied to motor-driven dishwasher appliance.

FIG. 7 shows portions of the motor start circuit 60 in a typical application, such as a household dishwasher. Relay switch 32 applies AC power to the circuit. Main winding 34 operates the pump motor. Triac 46 controls power to start winding 54, causing the pump to start in one direction for a wash cycle. Triac 47 controls power to start winding 56, causing the pump to start in the opposite direction for a drain cycle. Relays 62, 64 and triac's 66, 68, 70 control other dishwasher functions unrelated to motor control and are not further described.

The aforementioned description is intended to be illustrative and not restrictive. Other obvious variations will occur to those of skill in the art. These variations are intended to be encompassed by the invention, which is limited only by the scope and spirit of the appended claims.

What is claimed is:

1. A motor starter circuit for an AC electric motor having a run winding, a first start winding and a second start winding, said circuit comprising:

a run winding current sensor;

a sensor switch having an input coupled to said current sensor and having an output;

a controller having a controller input coupled to said sensor switch output and having a first controller output and a second controller output and including a phase detector responsive to a phase shift of a signal applied at said controller input;

a first starter switch responsive to and output of said phase detector and having a first starter switch input coupled to said first controller output and having a first starter switch output coupled to said first start winding; and a second starter switch responsive to an output of said phase detector and having a second starter switch input coupled to said second controller output and having a second starter switch output coupled to said second start winding, wherein said sensor switch includes a semiconductor switch biased with a signal containing a ripple component derived from an AC voltage applied to said run winding wherein said ripple component is phased shifted approximately 90 degrees from said AC voltage.

2. The starter circuit of claim 1, wherein said current sensor is a resistive element connected in series with said run winding.

3. The starter circuit of claim 1, wherein said sensor switch is a transistor.

4. The starter circuit of claim 1, wherein said controller is a digital logic element.

5. The starter circuit of claim 1, wherein said controller is a microprocessor.

6. The starter circuit of claim 5, wherein:

said controller is a microprocessor programmed to detect a signal transition at said controller input; and said microprocessor is further programmed to control power to at least one of said first and second start windings.

7. The starter circuit of claim 5, wherein said microprocessor is programmed to detect a phase shift of a signal at said controller input.

8. The starter circuit of claim 5, wherein said microprocessor is programmed to determine an amount of a phase shift of a signal at said controller input.

9. The starter circuit of claim 1, wherein at least one of said first and second starter switches includes a triac.

10. An electric motor control system, said system comprising:

an AC electric motor having a run winding, a first start winding and a second start winding;

a run winding current sensor;

a sensor switch having an input coupled to said current sensor and having an output;

a controller having a controller input coupled to said sensor switch output and having a first controller output and a second controller output and including a phase detector responsive to a phase shift of a signal applied at said controller input;

a first starter switch responsive to an output of said phase detector and having a first starter switch input coupled to said first controller output and having a first starter switch output coupled to said first start winding; and a second starter switch responsive to an output of said phase detector and having a second starter switch input coupled to said second controller output and having a second starter switch output coupled to said second start winding wherein said sensor switch includes a semiconductor switch biased with a signal containing a ripple component derived from an AC voltage applied to said run winding wherein said ripple component is phased shifted approximately 90 degrees from said AC voltage.

11. The system of claim 10, wherein said current sensor is a resistive element connected in series with said run winding.

12. The system of claim 10, wherein said sensor switch is a transistor.

13. The system of claim 10, wherein said controller is a digital logic element.

14. The system of claim 10, wherein said controller is a microprocessor.

15. The system of claim 14, wherein:

said controller is a microprocessor programmed to detect a signal transition at said controller input; and said microprocessor is further programmed to control power to at least one of said first and second start windings.

16. The system of claim 14, wherein said microprocessor is programmed to detect an existence of a phase shift of a signal at said controller input.

17. The system of claim 14, wherein said microprocessor is programmed to determine an amount of a phase shift of a signal at said controller input.

18. The system of claim 10, wherein at least one of said first and second starter switches includes a triac.

19. A method of starting an AC electric motor having a run winding and at least one start winding, said method comprising the steps of:

applying AC voltage to a run winding of said electric motor;

detecting a phase difference between said AC voltage and a current passing through said run winding;

applying AC voltage to a start winding of said electric motor;

detecting a shift in said phase difference with a digital logic element; and removing said AC voltage from said start winding, based on said shift in said phase differences, wherein the step of detecting a phase difference includes using a semiconductor sensor switch biased with a signal containing a ripple component phase shifted approximately 90 degrees from said AC voltage.

20. The method of claim 19, wherein:

the step of detecting a shift in said phase difference includes the step of detecting when said shift reaches a predetermined value; and the step of removing includes the step of removing AC voltage when said shift reaches said predetermined value.

21. The method of claim 19, wherein:

the step of detecting a shift in said phase difference includes the step of detecting when said shift occurs; and the step of removing includes the step of removing AC voltage when said shift occurs.

22. The method of claim 19, wherein the step of detecting a phase difference includes the step of measuring a phase of said current.

23. The method of claim 19, wherein the step of detecting a phase difference includes the step of measuring an amplitude of said current.

24. The method of claim 19, wherein:

the step of applying AC voltage to a start winding includes the step of turning on a triac; and the step of removing AC voltage from said start winding includes the step of turning off a triac.

25. A method of claim 19, wherein the steps of detecting a phase difference, detecting a shift, and removing AC voltage each include using a microprocessor.

26. A motor starter circuit for an AC electric motor having a run winding and at least one start winding, said circuit comprising:

a run winding current sensor;

a sensor switch having an input coupled to said current sensor and having an output;

a controller having a controller input coupled to said sensor switch output and having a first controller output and including a phase detector responsive to a phase shift of a signal applied at said controller input; and a first starter switch responsive to an output of said phase detector and having a first input coupled to said first controller output and having a first output coupled to said at least one start winding;

wherein said controller is configured for detecting a shift in a phase difference between said AC voltage and a current passing through said run winding for operating said first starter switch, and said sensor switch includes a semiconductor switch biased with a signal containing a ripple component derived from an AC voltage applied to said run winding wherein said ripple component is phased shifted approximately 90 degrees from said AC voltage.

27. The starter circuit of claim 26, wherein said current sensor is a resistive element connected in series with said run winding.

28. The starter circuit of claim 26, wherein said sensor switch is a transistor.

29. The starter circuit of claim 26, wherein said controller is a digital logic element.

30. The starter circuit of claim 26, wherein said controller includes a microprocessor.

31. The starter circuit of claim 30, wherein said microprocessor is programmed to detect a signal transition at said controller input; and said microprocessor is further programmed to control power to said at least one start winding from said first controller output.

32. The starter circuit of claim 31, further comprising a second starter switch with a second input and a second output, wherein:

said at least one start winding includes first and second start windings;

said controller has a second controller output coupled to said second starter switch input;

said second starter switch output is coupled to said second start winding; and said controller is further programmed to control power to said first start winding from said first controller output and to control power to said second start winding from said second controller output.

33. The starter circuit of claim 30, wherein said microprocessor is programmed to detect a phase shift of a signal at said controller input.

34. The starter circuit of claim 30, wherein said microprocessor is programmed to determine an amount of a phase shift of a signal at said controller input.

35. The starter circuit of claim 26, wherein said starter switch includes a triac.

* * * * *